(12) United States Patent
Azai

(10) Patent No.: US 6,471,156 B2
(45) Date of Patent: Oct. 29, 2002

(54) REEL SUPPORT FOR ROTATING REELS IN TAPE RECORDER

(75) Inventor: Koji Azai, Takefu (JP)

(73) Assignee: Orion Electric Co., Ltd., Fukui (JP)

( * ) Notice: Subject to any disclaimer, the term of this patent is extended or adjusted under 35 U.S.C. 154(b) by 0 days.

(21) Appl. No.: 09/834,929

(22) Filed: Apr. 16, 2001

(65) Prior Publication Data
US 2001/0030253 A1 Oct. 18, 2001

(30) Foreign Application Priority Data
Apr. 17, 2000 (JP) .......................................... 2000-114909

(51) Int. Cl.[7] ............................................... B65H 75/24
(52) U.S. Cl. ..................................... 242/571.5; 242/345
(58) Field of Search ........................... 242/571.5, 597.6, 242/345

(56) References Cited

U.S. PATENT DOCUMENTS

| | | | | |
|---|---|---|---|---|
| 1,796,770 A | * | 3/1931 | Stimpson | 242/571.5 |
| 1,809,049 A | * | 6/1931 | Lemoine et al. | 242/571.5 |
| 3,722,929 A | * | 3/1973 | Gilman | 242/571.5 |
| 4,541,587 A | * | 9/1985 | Stumpfi et al. | 242/597.6 |
| 5,062,579 A | * | 11/1991 | Noguchi | 242/597.6 |
| 5,170,959 A | * | 12/1992 | Jin | 242/597.6 |
| 5,492,280 A | * | 2/1996 | Corres et al. | 242/571.5 |

FOREIGN PATENT DOCUMENTS

JP          61-68760   *  4/1986   ............ 242/571.5

* cited by examiner

Primary Examiner—William A. Rivera
(74) Attorney, Agent, or Firm—Wenderoth, Lind & Ponack, L.L.P.

(57) ABSTRACT

A reel support for rotating reels in a magnetic tape cassette inserted in a magnetic tape recording-and-playing apparatus, is a resin mold and comprises a support stage having a reel post and blades integrally connected to and standing upright from the support stage. The upright blades extend in the longitudinal slots made in the circumference of the upright reel post. Each upright blade has a nail formed on its tip end, partially appearing from the circumference of the upright reel post to the extent of being caught by a selected projection in the indented-aperture of either reel. Each longitudinal slot has a stepwise indent formed on one side facing the tail side of the nail of the blade, thus permitting the corner of the nail to be engaged with the stepwise indent of the one side of the longitudinal slot when the blade is yieldingly bent as a counter action to the pushing of the confronting projection.

2 Claims, 4 Drawing Sheets

REEL SUPPORT FOR ROTATING REELS IN TAPE RECORDER

BACKGROUND OF THE INVENTION

1. Field of the Invention

The present invention relates to a magnetic tape recording-and-playing apparatus such as a videotape recorder, and more particularly to a reel support for rotating reels in a magnetic tape cassette inserted in a magnetic tape recording- and-playing apparatus.

2. Related Art

A videotape recorder using a magnetic tape cassette has a tape-loading mechanism equipped therewith. Specifically the magnetic tape is pulled out of the cassette to be applied to the rotary head cylinder with the aid of the tape-loading mechanism. Thus, the rotary head cylinder is loaded with the magnetic tape with accuracy. To assure that the tape-loading mechanism works well it is necessary that the winding reel support and rewinding reel support of the videotape recorder be fitted in the winding reel and rewinding reel of the cassette with accuracy.

The reel support for rotating either reel in the cassette comprises a support stage, a reel post and blades, all of which are integrally connected to provide a whole body. The support stage is used for bearing the cassette reel, and the reel post stands upright on the support stage to be press-fitted in the hole of either cassette reel. The reel post has longitudinal slots made in its circumference, each containing a selected blade loosely, allowing one part of the blade to project outward from the longitudinal slot. When the reel post is press-fitted in the aperture of the winding or rewinding reel, the blades are engaged with some selected projections of the indented aperture of the winding or rewinding reel. Thus, the winding or rewinding reel can be rotated by rotating the reel support.

Referring to FIGS. 5(a) and 5(b), the reel support is rotated clockwise as indicated by the arrow, making each blade 51 abut on the confronting side of a selected projection 53 in the reel indented-aperture to transmit the torque from the reel support to the cassette reel via the blade 51. As seen from FIG. 5(a), the blade 51 is yieldingly bent counterclockwise (leftward in the drawing) to abut on the confronting inner sidewall 55 of the longitudinal slot 54. Thereafter, the blade 51 is yieldingly bent inward as indicated by the arrow, and then, it may happen that the blade 51 comes off from the projection 53, which is called "blade hopping".

Such "blade hopping" can be prevented by increasing the blade's resistance to bending. Such a stiff blade 51 will prevent the reel post from getting in the reel indented-aperture 52 when the blades 51 happen to ride on the selected projections 53 in the reel indented-aperture 52 (see FIG. 5(b); broken lines). If the reel post is press-fitted in the reel indented-aperture 52 by making the stiff blade 51 yieldingly bend inward by force (see FIG. 5(b); solid lines), the stiff blade 51 can hardly come off and fall from the projection 53 down to the inter-projection space 56 to be caught at the confronting side of the subsequent projection. Even though the stiff blade 51 slips off from the projection 53 fortunately, unpleasing sound is produced.

To prevent the blade from riding on the projection and from holding tightly each other it is necessary that the blade's resistance to bending be reduced, but to prevent the "blade hopping" it is necessary that the blade's resistance to bending be increased. Apparently this is contradictory, and no satisfactory reel support can be designed.

The longitudinal slot 54 has a narrow gap remaining between either side of the blade 51 and the confronting inner wall 55. The blade width can be increased in the longitudinal slot by reducing the opposite gaps 57 in the slot. The so widened blade 51 can have an increased resistance to the circumferential bending as a counter action to abutment on the projection 53 (see FIG.5(a)), and accordingly the possibility of "blade hopping" is reduced. The widening of the blade still permits the blade 51 to bend yieldingly inward apart from the projection 53 even if the blade 51 should ride on the projection 53. The blade 51, therefore, can come off from the projection 53 with ease.

This remedy, however, requires a metal mold whose parts to shape such narrow gaps in the longitudinal slot are too thin to be used for a long time. Thus, the life of the metal mold is reduced significantly.

SUMMARY OF THE INVENTION

One object of the present invention is to provide a reel support which is guaranteed to be free of "blade hopping" and "tight-holding of the blade and the projection".

To attain this object a reel support for rotating one of the winding and rewinding reels in a magnetic tape cassette inserted in a magnetic tape recording-and-playing apparatus, is improved according to the present invention in that the reel support is a resin mold, and that the reel support comprises a support stage having a reel post and blades integrally connected to and standing upright from the support stage, the upright blades extending in the longitudinal slots made in the circumference of the upright reel post, each upright blade having a nail formed on its tip end, partially appearing from the circumference of the upright reel post to the extent of being caught by a selected projection in the indentation of the aperture of either reel; each longitudinal slot has a stepwise indent formed on one side facing the tail side of the nail of the blade, thus permitting the corner of the nail to be engaged with the stepwise indent of the one side of the longitudinal slot.

With this arrangement each blade can have a good flexibility sufficient to allow the blade to come off from the counter projection even though the blade rides thereon, falling into the inter-projection space to be caught and supported by the stepwise indent of the confronting side of the slot in the reel post. Thus, further bending of the blade which would cause the "blade hopping" can be prevented effectively. Still advantageously, the stepwise indent of one inside wall of each slot permits the corresponding part of the metal mold to increase its strength.

The nail of each blade can be engaged with a selected projection in the indentation of the aperture of either reel in a plane containing the center axis of the reel support; and the corner of the nail to be engaged with the stepwise indent of the one side of the longitudinal slot is shaped so as to be complementary to the stepwise indent, but the corner of the nail is somewhat apart radially from the stepwise indent.

Other objects and advantages of the present invention will be understood from the following description of a reel support for rotating one of the winding and rewinding reels in a magnetic tape cassette according to one preferred embodiment of the present invention, which is shown in the accompanying drawings:

BRIEF DESCRIPTION OF THE DRAWINGS

FIG. 5(a) illustrates how "blade hopping" is caused in a conventional reel support whereas

DETAILED DESCRIPTION OF PREFERRED EMBODIMENT

Figure 1A:
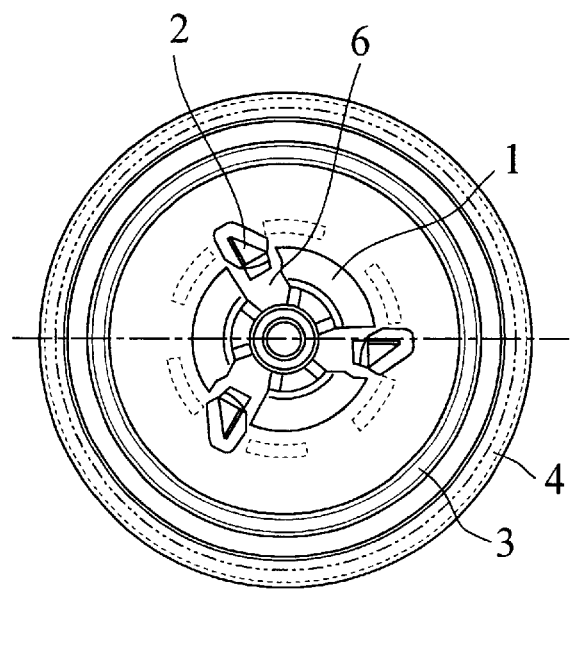
FIG. 1(a) is a plan view of a reel support according to the present invention.
Figure 1B:
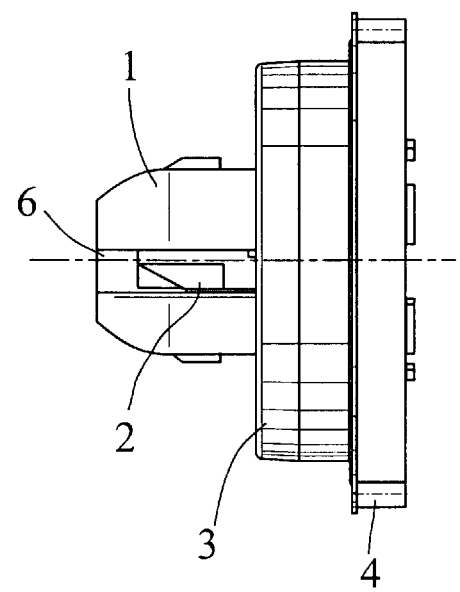
FIG. 1(b) is a side view of the reel support.
Figure 1C:
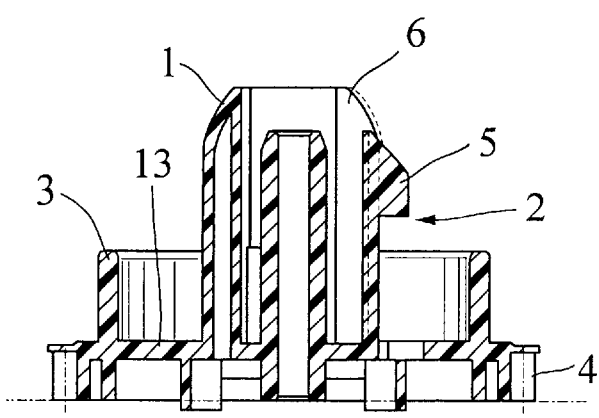
FIG. 1(c) is a longitudinal section of the reel support.

Referring to FIGS. 1(a), 1(b) and 1(c), a reel support according to the present invention is a resin mold, and the reel support comprises a support stage 3 having a reel post 1 and blades 2 integrally connected to and standing upright from the support stage 3. Each blade 2 has a nail 5 formed on its top. The support stage 3 is fixed to a gear 4. The reel post 1 has a converging end, and has longitudinal slots 6 made on its circumference. Each slot contains a selected blade 2 loosely.

Specifically the upright blade 2 extends in each longitudinal slot 6, leaving a narrow space on both a circumferential side and a rear side, so that the blade 2 may be bent on either side (i.e., circumferentially) and backward. The blade 2 has its nail 5 appearing out of the slot 6.

Figure 2:
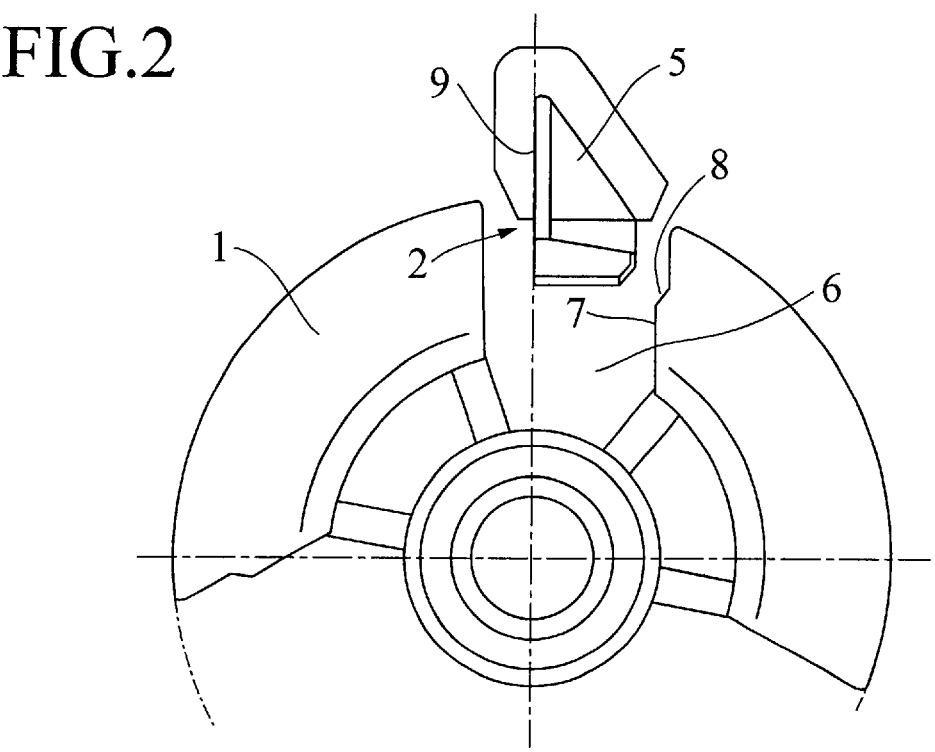
FIG. 2 illustrates how a nail of a blade is positioned relative to a stepwise indent.

Referring to FIG. 2, the nail 5 is a triangular piece having an engagement surface 9 formed on one side. The nail 5 of each blade 2 is in a plane containing the center axis of the reel support, and the triangular nail 5 can be engaged with a selected projection in the indentation of the aperture of either reel. The blade 2 has a thin shank flexible enough to yieldingly bend in the slot 6. Each longitudinal slot 6 has a stepwise indent 8 formed on one side facing the tail side of the nail 5 of the blade 2, thus permitting the corner of the nail 5 to be engaged with the stepwise indent 8 of the one side of the longitudinal slot 6 when the blade 2 is pushed toward the one side of the longitudinal slot 6.

Figure 3:
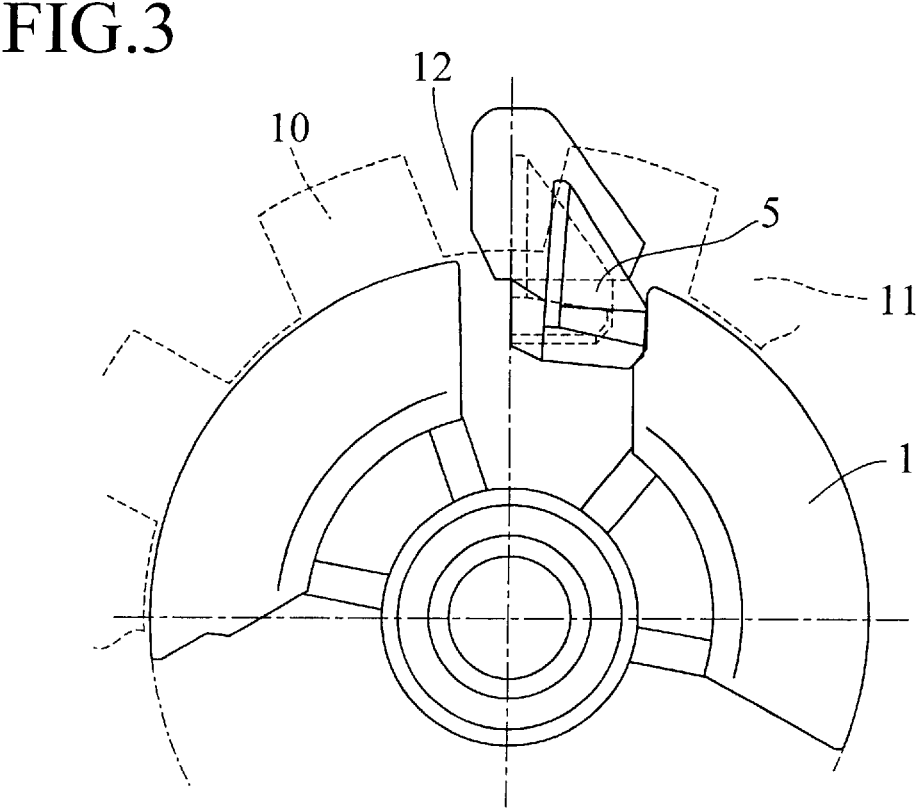
FIG. 3 illustrates how the nail of the blade is caught by the stepwise indent.

FIG. 3 illustrates how the reel post 1 is fitted in the reel indented-aperture 10 to drive the winding or unwinding reel 11 in the cassette. As seen from the drawing, projections 12 are formed at regular intervals on the inner circumference of the reel aperture to extend toward the axis of the reel post 1. Rotation of the reel post 1 can be transmitted to the winding or unwinding reel 11 via the nails 5, thus permitting the reel 11 to wind or unwind the magnetic tape.

In rotating the winding or rewinding reel 11 by the nails 5 the blades 2 are yieldingly bent as counter actions to the pushing of the confronting projections 12 of the reel indented-aperture until the corner of each nail 5 has been engaged with the stepwise indent of the confronting side of the longitudinal slot; the corner of the nail 5 is shaped so as to be complementary to the stepwise indent, and is somewhat apart radially from the stepwise indent, thereby permitting the corner of the nail 5 to fit on the stepwise indent when the blade 2 is yieldingly bent to lower the nail corner down to the stepwise indent.

Figure 4:
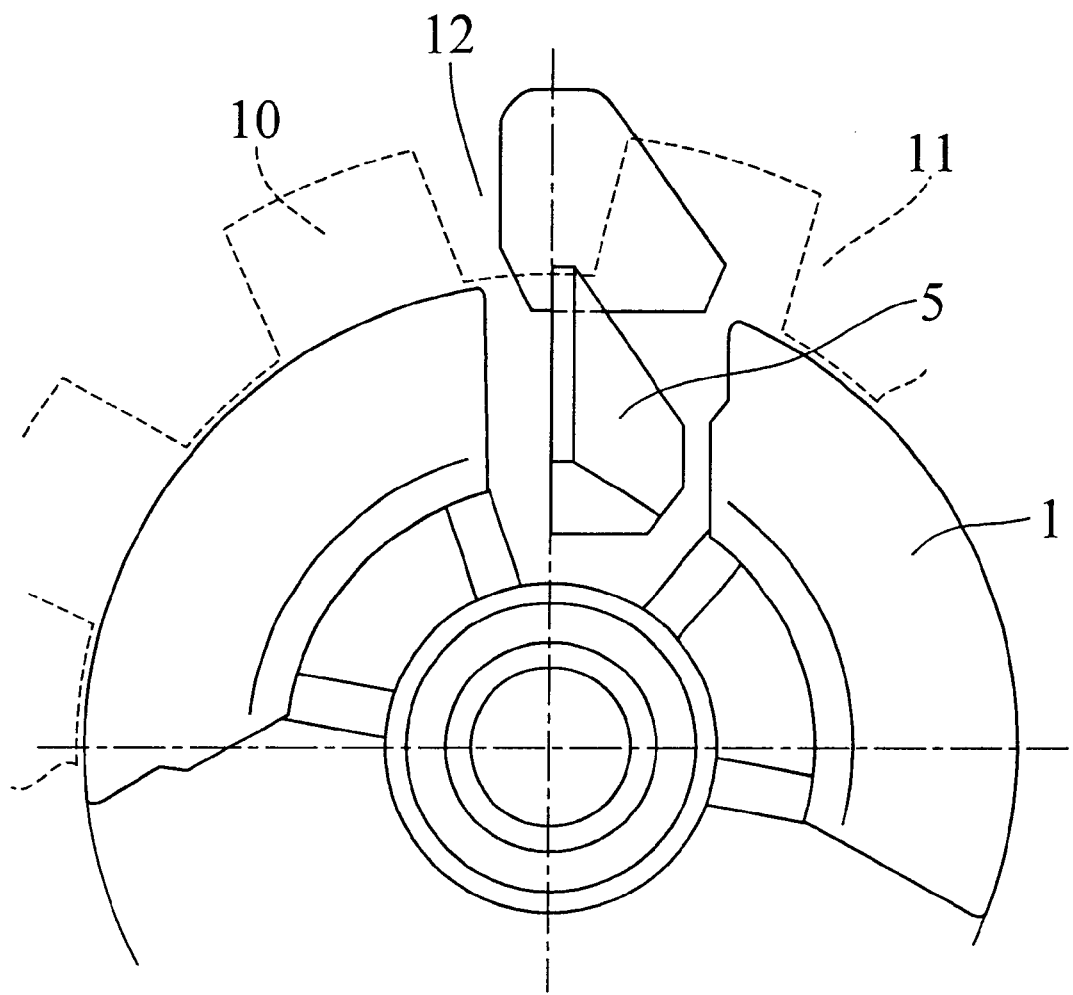
FIG. 4 illustrates how the nail of the blade rides on a counter projection.
Figure 5A:
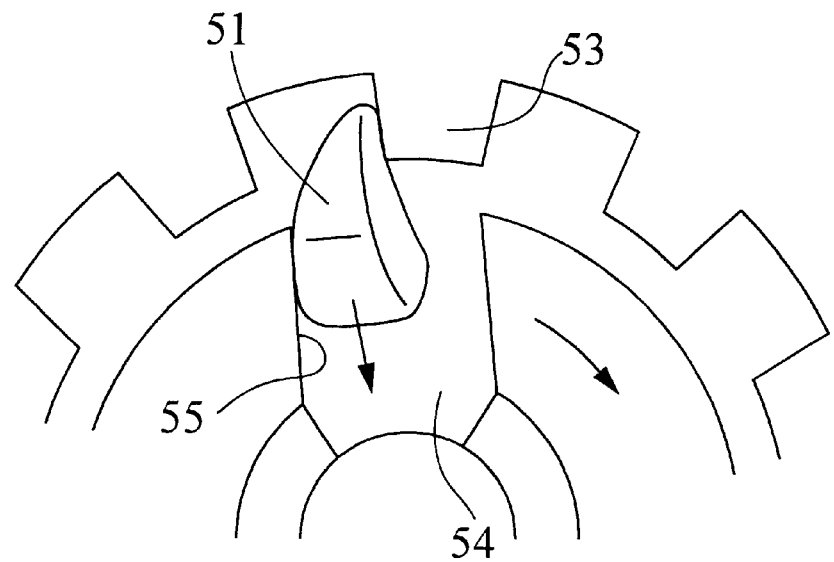
Figure 5B:
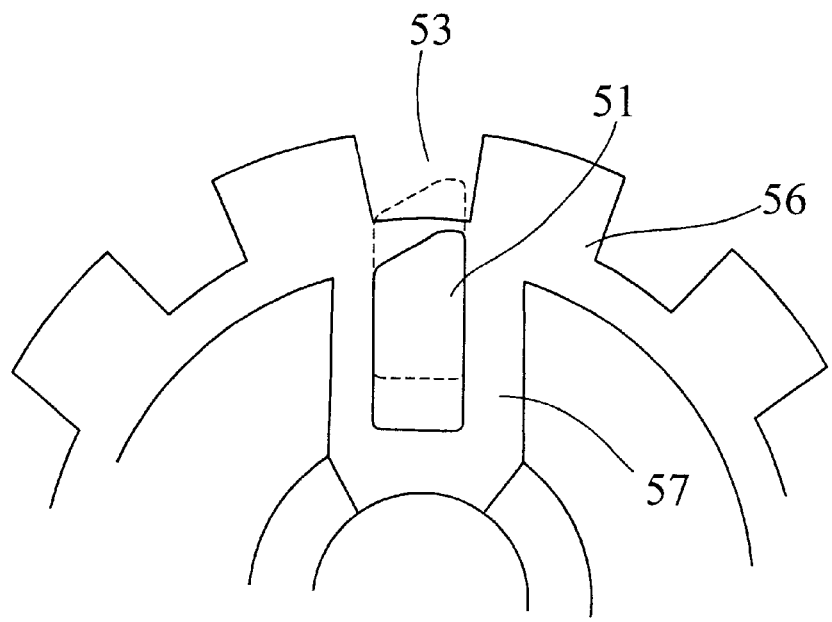
FIG. 5(b) illustrates how "tight-holding of the blade and the projection" is caused.

Referring to FIG. 4, when the cassette is loaded into the videotape recorder, the nails 5 of the blades 2 happen to ride on some selected projections 12 of the indentations of the reel indented-aperture 10, in which the reel post 1 is inserted. Then, the blades 2 are yieldingly bent inward, and rotation of the reel post 1 allows the nails 5 to come off from the counter projections, falling in the adjacent inter-projection spaces to be caught by the confronting sides of the projections 12 as shown in FIG. 3. Thus, the normal rotation of the winding or unwinding reel 11 is permitted.

As may be understood from the above, use of flexible blades and stepwise indents on selected slot inner sidewalls according to the present invention provides the following advantages:

the flexible blades' bending yieldingly inward or withdrawal as their counter action to the pushing of the confronting projections of the reel indented-aperture effectively prevents the tight blade-and-projection holding in the reel indented- aperture, and the stepwise indents functioning as a retainer to prevent further bending of the blade effectively prevents the "blade hopping"; and the stepwise indents in the slot permit the corresponding parts of the metal mold to increase the strength of the metal mold, thereby elongating the life of the metal mold.

What is claimed is:

1. A reel support for rotating reels in a magnetic tape cassette inserted in a magnetic tape recording-and-playing apparatus, wherein the reel support is a resin mold, and the reel support comprises a support stage having a reel post and blades integrally connected to and standing upright from the support stage, the upright blades extending in longitudinal slots provided in a circumference of the upright reel post, each upright blade having a tip end and a nail formed on said tip end and partially appearing from the circumference of the upright reel post for being caught by a selected projection in an indentation of an aperture of either reel; and said longitudinal slots have stepwise indents respectively formed on sides thereof facing tail sides of the nails of the blades respectively extending in the longitudinal slots, thus permitting corners of the nails to be respectively engaged with the stepwise indents.

2. A reel support for rotating reels in a magnetic tape cassette inserted in a magnetic tape recording-and-playing apparatus, according to claim 1, wherein the nail of each blade can be engaged with a selected projection in the indentation of the aperture of either reel in a plane containing a center axis of the reel support; and the corners of the nails to be engaged with the stepwise indents of the sides of the longitudinal slots are shaped to be complementary to the stepwise indents, but the corners of the nails are respectively spaced apart radially from the stepwise indents.

* * * * *